United States Patent
Nishikawa (10) Patent No.: US 10,730,127 B2
(45) Date of Patent: Aug. 4, 2020

(54) CONTROL DEVICE FOR WIRE ELECTRICAL DISCHARGE MACHINE AND CONTROL METHOD OF WIRE ELECTRICAL DISCHARGE MACHINE

(71) Applicant: FANUC CORPORATION, Yamanashi (JP)

(72) Inventor: Ryou Nishikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 34 days.

(21) Appl. No.: 16/009,323

(22) Filed: Jun. 15, 2018

(65) Prior Publication Data
US 2018/0361490 A1     Dec. 20, 2018

(30) Foreign Application Priority Data
Jun. 19, 2017   (JP) .................. 2017-119373

(51) Int. Cl.
*B23H 7/20*        (2006.01)
*B23H 7/18*        (2006.01)
(Continued)

(52) U.S. Cl.
CPC ............ *B23H 7/20* (2013.01); *B23H 7/04* (2013.01); *B23H 7/16* (2013.01); *B23H 7/18* (2013.01); *B23H 7/32* (2013.01); *G05B 19/19* (2013.01); *G05B 2219/42249* (2013.01); *G05B 2219/45043* (2013.01); *G05B 2219/45221* (2013.01)

(58) Field of Classification Search
None
See application file for complete search history.

(56) References Cited

U.S. PATENT DOCUMENTS 4,392,041 A   7/1983  Yatomi et al.
4,864,091 A   9/1989  Boccadoro
(Continued)

FOREIGN PATENT DOCUMENTS

CN    1355735 A    6/2002
CN    1583337 A    2/2005
(Continued)

OTHER PUBLICATIONS

Extended European Search Report issued in EP Application No. 18177536.2; dated Oct. 29, 2018; 6 pages.

*Primary Examiner* — Mohammad Ali
*Assistant Examiner* — Saad M Kabir
(74) *Attorney, Agent, or Firm* — Hauptman Ham, LLP (57) ABSTRACT

A control device includes a speed setting unit configured to set a relative movement speed of a wire electrode with respect to a workpiece depending on the average of gap voltage per unit time, i.e., average gap voltage, and set the relative movement speed so as to move the wire electrode backward when the average gap voltage is less than a threshold, and a map compensation unit configured to change the threshold from a first threshold that is set when the amount of change in the average gap voltage is lower than a predetermined variation, to a second threshold that is greater than the first threshold, when the average gap voltage has changed in a decreasing direction and the amount of change in the average gap voltage becomes equal to or greater than the predetermined variation.

8 Claims, 11 Drawing Sheets

(51) Int. Cl.
*G05B 19/19* (2006.01)
*B23H 7/32* (2006.01)
*B23H 7/16* (2006.01)
*B23H 7/04* (2006.01)

(56) References Cited

U.S. PATENT DOCUMENTS

| | | | |
|---|---|---|---|
| 5,689,427 A | 11/1997 | Li et al. | |
| 2003/0098293 A1* | 5/2003 | Sato | B23H 7/04 |
| | | | 219/69.12 |
| 2006/0091113 A1 | 5/2006 | Hiraga et al. | |

FOREIGN PATENT DOCUMENTS

| | | |
|---|---|---|
| CN | 100409988 C | 8/2008 |
| CN | 101947675 B | 6/2012 |
| CN | 103418865 A | 12/2013 |
| CN | 105364240 A | 3/2016 |
| CN | 106041234 A | 10/2016 |
| CN | 106132611 A | 11/2016 |
| EP | 0521193 A2 | 1/1993 |
| JP | H7-32218 A | 2/1995 |
| JP | H10-109226 A | 4/1998 |
| JP | H11-90734 A | 4/1999 |
| JP | 2003-165031 A | 6/2003 |
| JP | 2006-15478 A | 1/2006 |
| JP | 2017-42858 A | 3/2017 |
| WO | 80/02003 A1 | 10/1980 |
| WO | 2015/087389 A1 | 6/2015 |

\* cited by examiner

CONTROL DEVICE FOR WIRE ELECTRICAL DISCHARGE MACHINE AND CONTROL METHOD OF WIRE ELECTRICAL DISCHARGE MACHINE

CROSS-REFERENCE TO RELATED APPLICATION

This application is based upon and claims the benefit of priority from Japanese Patent Application No. 2017-119373 filed on Jun. 19, 2017, the contents of which are incorporated herein by reference.

BACKGROUND OF THE INVENTION

Field of the Invention

The present invention relates to a control device for a wire electrical discharge machine and a method of controlling the wire electrical discharge machine, in which a wire electrode is moved relatively to a workpiece to perform electrical discharge machining on the workpiece with the wire electrode.

Description of the Related Art

Japanese Laid-Open Patent Publication No. 2003-165031 discloses a machine that is adapted to move a wire electrode backward from a workpiece when the average voltage between the wire electrode and the workpiece becomes lower than a short-circuit reference voltage.

SUMMARY OF THE INVENTION

Since, in finishing mode, a discharge voltage applied across a gap between the wire electrode and the workpiece is smaller than that in rough machining mode while the gap between the wire electrode and the workplace is narrow, the average voltage is liable to fall sharply. Therefore, before the wire electrode is moved back from the workpiece, the wire electrode is prone to touch the workpiece, causing a short-circuit problem.

The present invention has been devised to solve the above problem, and it is therefore an object of the present invention to provide a control device for a wire electrical discharge machine capable of suppressing short-circuiting between a wire electrode and a workpiece, as well as to provide a control method of such a wire electrical discharge machine.

An aspect of the present invention resides in a control device for a wire electrical discharge machine configured to perform electrical discharge machining on a workpiece with a wire electrode by relatively moving the wire electrode with respect to the workplace in accordance with a numerical control (NC) program having a plurality of blocks for defining a machining path, including: a discharge status acquisition unit configured to obtain a discharge status value, which is a gap voltage between the wire electrode and the workpiece or the reciprocal of the number of electrical discharge pulses between the wire electrode and the workpiece; a speed setting unit configured to set a relative movement speed of the wire electrode with respect to the workpiece depending on the discharge status value per unit time, and set the relative movement speed so as to move the wire electrode backward when the discharge status value per unit time is less than a threshold; a threshold setting unit configured to, when the discharge status value per unit time has changed in a decreasing direction and the amount of change in the discharge status value per unit time becomes equal to or greater than a predetermined variation, change the threshold from a first threshold that is set when the amount of change in the discharge status value per unit time is lower than the predetermined variation, to a second threshold that is greater than the first threshold; and a relative movement control unit configured to perform control so as to relatively move the wire electrode with respect to the workpiece along the machining path at the set relative movement speed.

According to the present invention, it is possible to suppress occurrence of short-circuiting between the wire electrode and the workpiece.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Wire Electrical Discharge Machine and Control Device]

Figure 1:
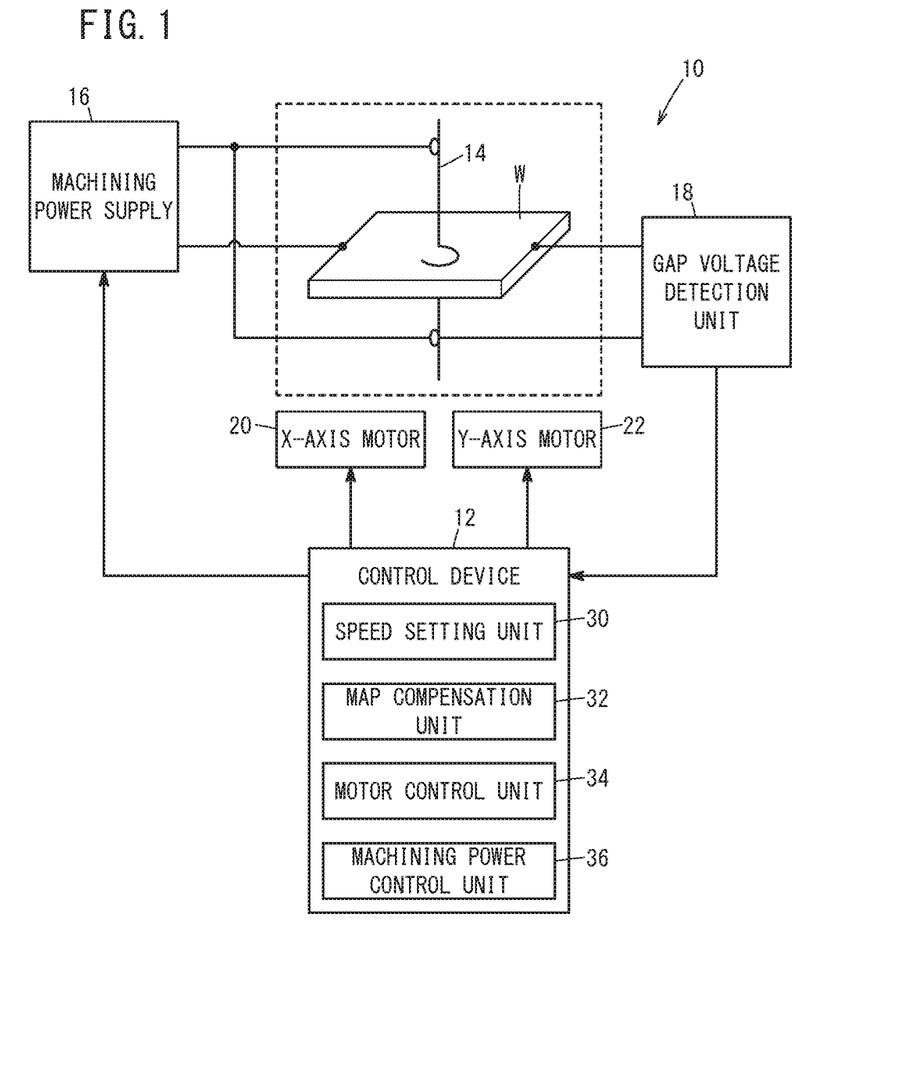
FIG. 1 is a schematic diagram showing a configuration of a wire electrical discharge machine and a control device for controlling the wire electrical discharge machine.

FIG. 1 is a schematic diagram showing a configuration of a wire electrical discharge machine 10 and a control device 12 for controlling the wire electrical discharge machine 10. The wire electrical discharge machine 10 is a machine tool that generates electrical discharge by applying voltage across an electrode gap formed between a wire electrode 14 and a workpiece W to thereby perform electrical discharge machining on the workpiece W. The wire electrode 14 is made of, for example, metal material such as tungsten-based, copper alloy-based, and brass-based material. On the other hand, the workplace W is made of, for example, an iron-based material, a superhard material (e.g., tungsten carbide), or the like. The wire electrical discharge machine 10 includes a machining power supply 16 for applying voltage between the wire electrode 14 and the workpiece W, and an gap voltage detection unit 18 for detecting the voltage (which will be also referred to as gap voltage) between the wire electrode 14 and workpiece W. The gap voltage detection unit 18 corresponds to a discharge status acquisition unit of the present invention. Further, the wire electrical discharge machine 10 includes an X-axis motor 20 and a Y-axis motor 22 for moving an unillustrated worktable so as to relatively move the workpiece W fixed on the worktable relative to the wire electrode 14.

The control device 12 includes a speed setting unit 30, a map compensation unit 32, a motor control unit 34, and a machining power control unit 36. The speed setting unit 30 receivers the gap voltage detected by the gap voltage detection unit 18, determines the average value of gap voltage per unit time (the time average of gap voltage) (hereinafter referred to as the average gap voltage), and calculates a directive relative speed command value corresponding to the average gap voltage, based on an average gap voltage vs. relative speed command value map. The map compensation unit 32 sets the average gap voltage vs. relative speed command value map, used in the speed setting unit 30. The map compensation unit 32 corresponds to a threshold setting unit of the present invention. The average gap voltage vs. relative speed command value map will be detailed later.

The motor control unit 31 controls the X-axis motor 20 and the Y-axis motor 22 so as to cause the workpiece W to move along a machining path specified by a numerical control (NC) program stored in a memory, so that the wire electrode 14 moves relatively to the workpiece W. The motor control unit 34 corresponds to a relative movement control unit of the present invention. The machining power control unit 36 controls the machining power supply 16 so as to generate discharge pulses between the wire electrode 14 and the workpiece W.

[Relative Speed Command Value Setting Process]

Figure 2:
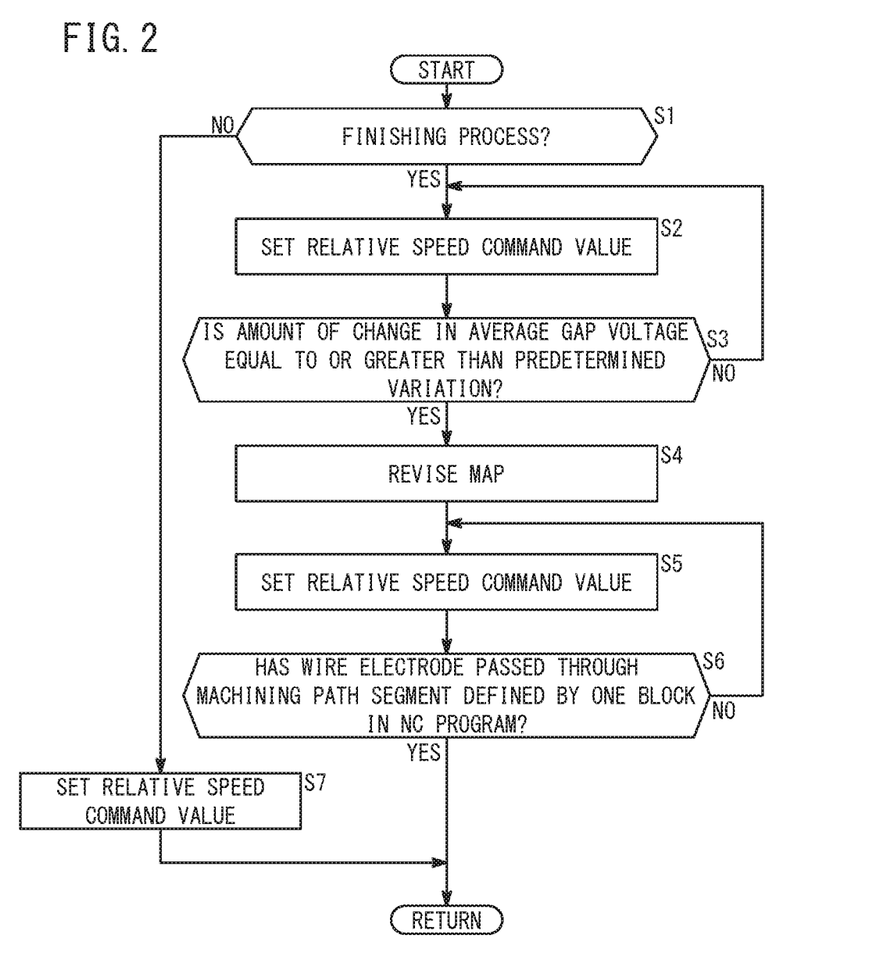
FIG. 2 is a flowchart showing the flow of a relative speed command setting process performed in a speed setting unit and a map compensation unit.

FIG. 2 is a flowchart showing the flow of a relative speed command value setting process performed in the speed setting unit 30 and the map compensation unit 32. The relative speed command value setting process is repeatedly performed during electrical discharge machining of the workpiece W.

At step S1, the map compensation unit 32 determines whether or not the current machining is a finishing process. If it is a finishing process, the control goes to step S2, and if it is not a finishing process, the control goes to step S7.

Figure 3:
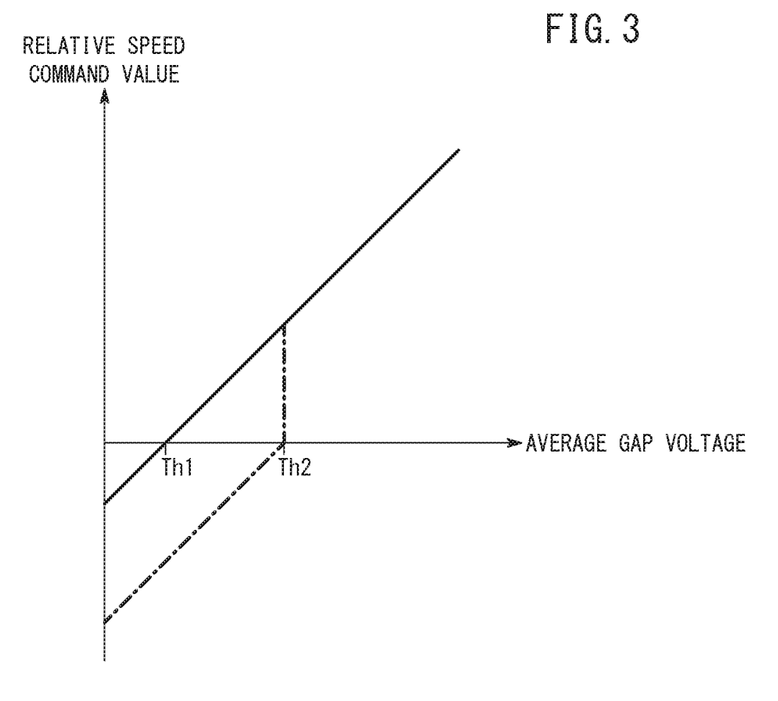
FIG. 3 is a diagram showing an average gap voltage vs. relative speed command value map.

At step S2, the speed setting unit 30 sets a relative speed command value based on the average gap voltage vs. relative speed command value map, and the control proceeds to step S3. FIG. 3 is a diagram showing an average gap voltage vs. relative speed command value map. The average gap voltage vs. relative speed command value map is set in advance and stored in the memory. As indicated by the solid line in FIG. 3, the average gap voltage vs. relative speed command value map is set such that the relative speed command value takes a positive value when the average gap voltage is equal to or greater than a first threshold Th1, and takes a negative value when the average gap voltage is less than the first threshold Th1. Here, the wire electrode 14 is moved forward along the machining path when the relative speed command value positive, whereas the wire electrode 14 is moved backward along the machining path when the relative speed command value is negative. The first threshold Th1 is set to such a value that when the average gap voltage becomes less than the first threshold. Th1, the wire electrode 14 becomes too close to the workpiece W and is thus subjected to an increased risk of causing a short-circuit.

At step S3, the map compensation unit 32 determines whether or not the average gap voltage changes in a decreasing direction and the amount of change is equal to or greater than a predetermined variation. When the average gap voltage changes in a decreasing direction and the amount of change becomes equal to or greater than the predetermined variation, the control goes to step S4. When it is determined that the average gap voltage does not change in the decreasing direction, or when the amount of change in the average gap voltage is less than the predetermined variation, the control returns to step S2.

At step S4, the map compensation unit 32 changes the backward-movement threshold in the average gap voltage vs. relative speed command value map to a second threshold Th2, and the control proceeds to step S5. The second threshold Th2 is a value greater than the first threshold Th1, and set to a value which the average gap voltage takes when the average gap voltage changes in the decreasing direction and the amount of change becomes equal to or greater than the predetermined variation. The map compensation unit 32 sets the average gap voltage vs. relative speed command value map as indicated by the dot-and-dash line in FIG. 3 so that the relative speed command value takes a positive value when the average gap voltage is equal to or greater than the second threshold Th2, and takes a negative value when the average gap voltage is less than the second threshold Th2. At step S5, the speed setting unit 30 sets a relative speed command value based on the average gap voltage vs. relative speed command value map set at step S4, and then the control goes to step S6. When step S5 is executed immediately after the backward-movement threshold has been revised to the second threshold Th2 at step S4, the relative speed command value is set at such a value that the wire electrode 14 is moved backward along the machining path.

At step S6, the map compensation unit 32 determines whether or not the wire electrode 14 has passed through a machining path segment defined by one block of the NC program. When the wire electrode 14 has passed through the machining path segment defined by the one block of the NC program, the process is terminated, and when it has not passed through the machining path segment defined by one block of the NC program, the control returns to step S5.

Figure 4:
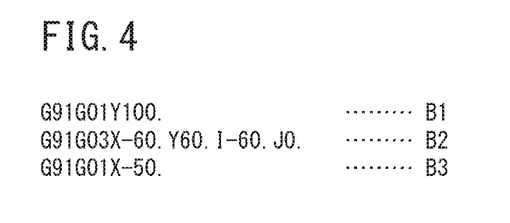
FIG. 4 is a diagram showing an example of a numerical control (NC) program.
Figure 5:
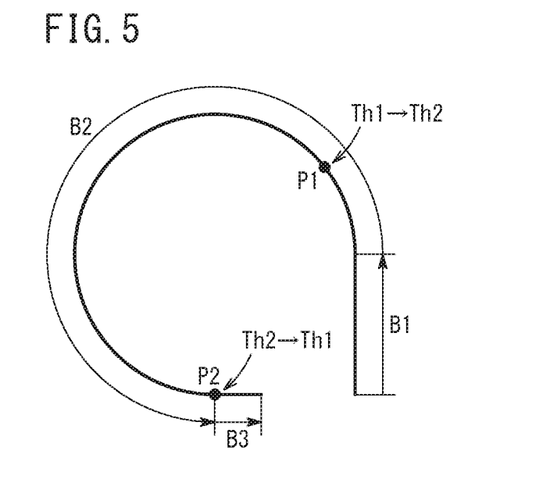
FIG. 5 is a diagram showing a machining path specified by the NC program of FIG. 4.

FIG. 4 is a diagram showing an example of a NC program. FIG. 5 is a diagram showing a machining path specified by the NC program of FIG. 4. In FIG. 4, B1 to B3 are reference marks to indicate respective blocks of the NC program. In FIG. 5, B1 to B3 show the segments in the machining path defined by the respective blocks of the NC program. Suppose that, for example, at a point P1 on the arc-shaped machining path segment defined by the block B2, the average gap voltage changes in the decreasing direction and the amount of change becomes the predetermined variation or more (i.e., the determination at step S3 is affirmative). In this case, after the point P1, the speed setting unit 30 sets the relative speed command value, based on the average gap voltage vs. relative speed command value map having the second threshold Th2 as the backward-movement threshold. Then, after point P2 at which the wire electrode 14 passes through the end point of the machining path segment defined by the block B2, the speed setting unit 30 sets the relative speed command value, based on the average gap voltage vs. relative speed command value map having the first threshold Th1 as the backward-movement threshold.

At step S1, when it is determined that the currently-performed machining is not a finishing process but is rough machining, the control proceeds to step S7. At step S7, the speed setting unit 30 sets the relative speed command value based on the average gap voltage vs. relative speed command value map, and the process is terminated. The backward movement threshold of the average gap voltage vs. relative speed command value map used at step S7 is the first threshold Th1.

[Operation and Effect]

In order to avoid contact between the wire electrode 14 and the workpiece W, it is desirable that the relative speed command value of the wire electrode 14 should be set according to the distance between the wire electrode 14 and the workpiece W (which will be also referred to as gap distance). However, it is difficult to directly measure the gap distance during the machining of the workpiece W. As the gap distance becomes shorter, discharge pulses occur more easily between the wire electrode 14 and the workpiece W, so that the time interval from application of discharge voltage to generation of a discharge pulse becomes shorter. Further, the duration of pause after occurrence of a discharge pulse per unit time becomes relatively longer, so that the average gap voltage becomes lower accordingly. This is why the relative speed command value is set in accordance with the average gap voltage, which is highly correlated to the gap distance.

Figure 6A:
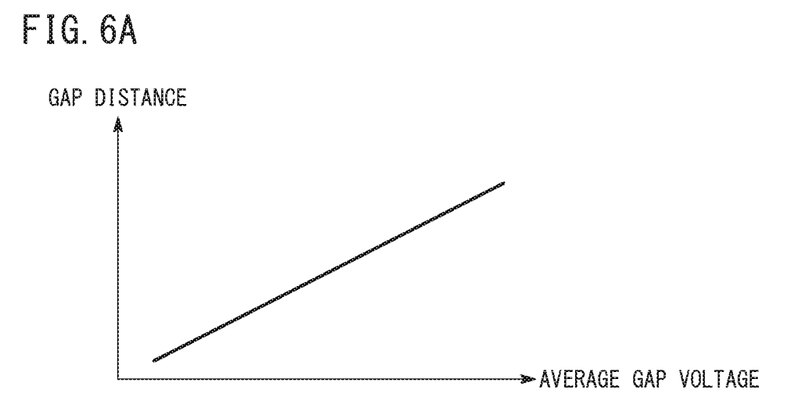
FIG. 6A is a diagram showing the relationship between the average gap voltage and the gap distance when the discharge voltage is high.
Figure 6B:
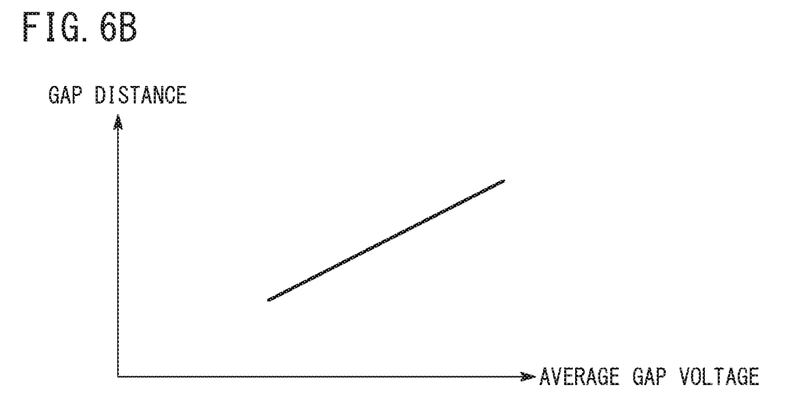
FIG. 6B is a diagram showing the relationship between the average gap voltage and the gap distance when the discharge voltage is low.

In the case of a finishing process, the discharge voltage is relatively low, so that the correlation between the average gap voltage and the gap distance becomes unstable. FIG. 6A is a diagram showing the relationship between the average gap voltage and the gap distance when the discharge voltage is high. FIG. 6B is a diagram showing the relationship between the average gap voltage and the gap distance when the discharge voltage is low. When the discharge voltage is high as in rough machining, the relationship between the average gap voltage and the gap distance can be expressed by a linear function as shown in FIG. 6A. When the discharge voltage is low as in finishing process, the relationship between the average gap voltage and the gap distance also can be expressed by a linear function as shown in FIG. 6B in a region where the average gap voltage is high. However, in a region where the average gap voltage is low, the relationship between the average gap voltage and the gap distance is unstable.

This is attributed to the fact that the repulsive force caused when discharge pulses are generated at a low discharge voltage is weak. When a discharge voltage is applied between the wire electrode 14 and the workpiece W, electromagnetic induction occurs in the workpiece W so that the workpiece W exerts attractive force on the wire electrode 14. The closer together the wire electrode 14 and the workpiece W are, the stronger the attractive force therebetween is. However, when the discharge voltage is high, even if the wire electrode 14 and workpiece W come close to each other, the attractive force can be canceled out by the repulsive force caused when discharge pulses are generated. In contrast, when the discharge voltage is low, in some cases, the attractive force cannot be canceled out by the repulsive force arising from generation of discharge pulses.

Figure 7A:
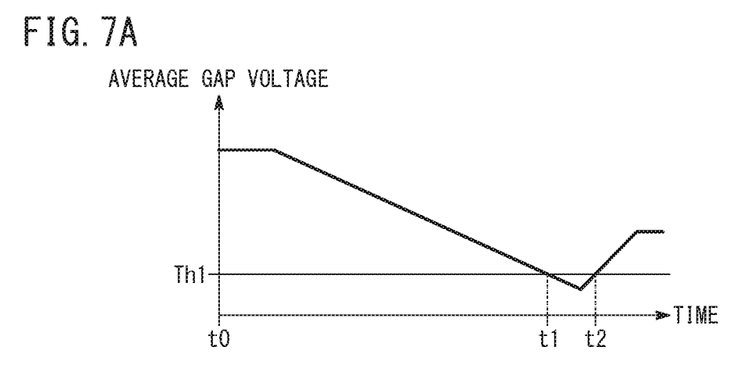
FIG. 7A is a time chart of the average gap voltage when the discharge voltage is high.
Figure 7B:
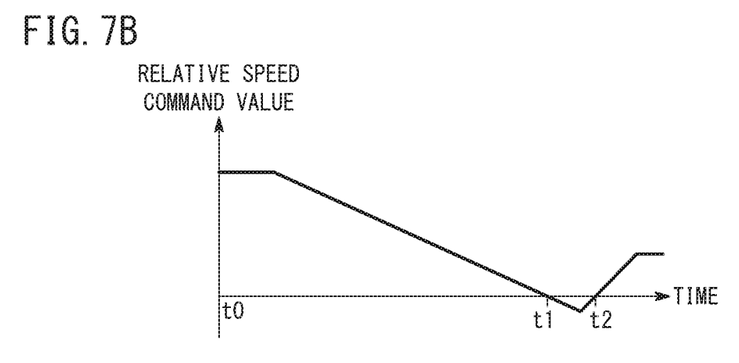
FIG. 7B is a time chart of a relative speed command value when the average gap voltage changes as shown in FIG. 7A.

FIG. 7A is a time chart of the average gap voltage when the discharge voltage is high. FIG. 7B is a time chart of the relative speed command value when the average gap voltage changes as shown in FIG. 7A. From time t0 to time t1 during which the average gap voltage is equal to or greater than the first threshold Th1, the relative speed command value is set so as to move the wire electrode 14 forward relative to the workpiece W. From time t1 to time t2 during which the average gap voltage is less than the first threshold Th1, the relative speed command value is set so as to move the wire electrode 14 backward along the machining path. Thus, it is possible to avoid contact of the wire electrode 14 with the workpiece W.

Figure 8A:
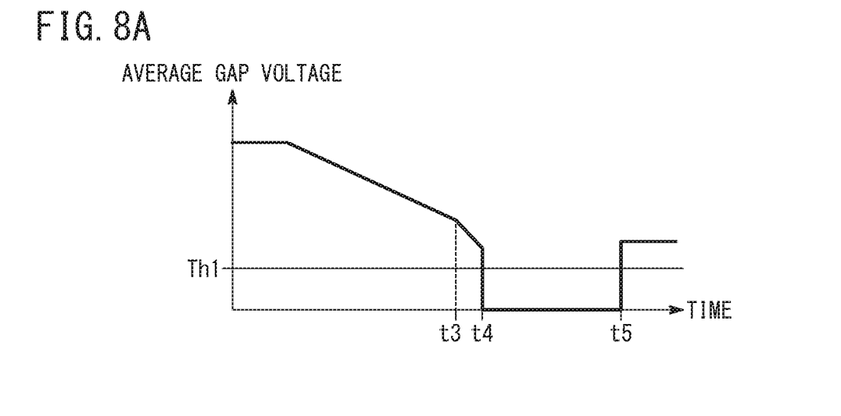
FIG. 8A is a time chart of the average gap voltage when the discharge voltage is low.
Figure 8B:
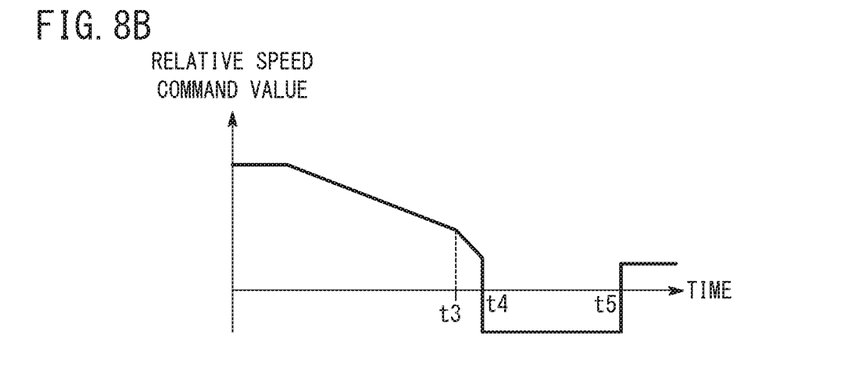
FIG. 8B is a time chart of a relative speed command value when the average gap voltage changes as show in FIG. 8A.

FIG. 8A is a time chart of the average gap voltage when the discharge voltage is low. FIG. 8B is a time chart of the relative speed command value when the average gap voltage changes as shown in FIG. 8A. When the discharge voltage is low, the average gap voltage is not stable near the first threshold Th1, and as shown in FIG. 8A, the voltage rapidly decreases after time t3, and momentarily falls to zero at time t4. The state in which the average gap voltage is zero means that the wire electrode 14 is in contact with the workpiece W and no discharge is caused. After time t4, since the average gap voltage is equal to or lower than the first threshold Th1, the relative speed command value is set so that the wire electrode 14 moves backward on the machining path. As a result, at time t5, the wire electrode 14 is out of contact with the workpiece W to thereby restart discharge.

When the wire electrode 14 touches the workpiece W, some traces or marks may be left on the machined surface of the workpiece W, which might deteriorate the precision of the machined surface. Further, when the wire electrode 14 is moved backward after the wire electrode 14 has touched the workpiece W, it takes time to cancel the contact between the workpiece W and the wire electrode 14, which leads to a reduction in machining speed.

To solve this problem, in the present embodiment, when the average gap voltage has changed in a decreasing direction and the amount of change is equal to or greater than the predetermined variation, the backward-movement threshold is changed from the first threshold Th1 to the second threshold Th2 greater than the first threshold Th1.

Figure 9A:
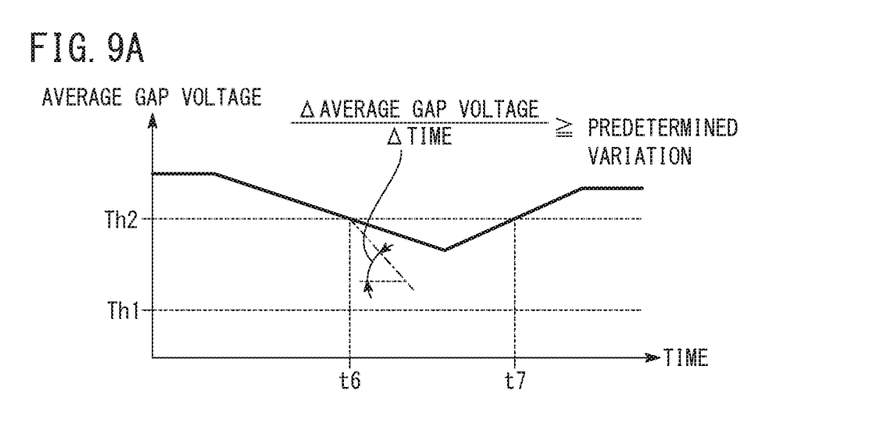
FIG. 9A is a time chart of the average gap voltage when the discharge voltage is low, with the backward-movement threshold set at a second threshold.
Figure 9B:
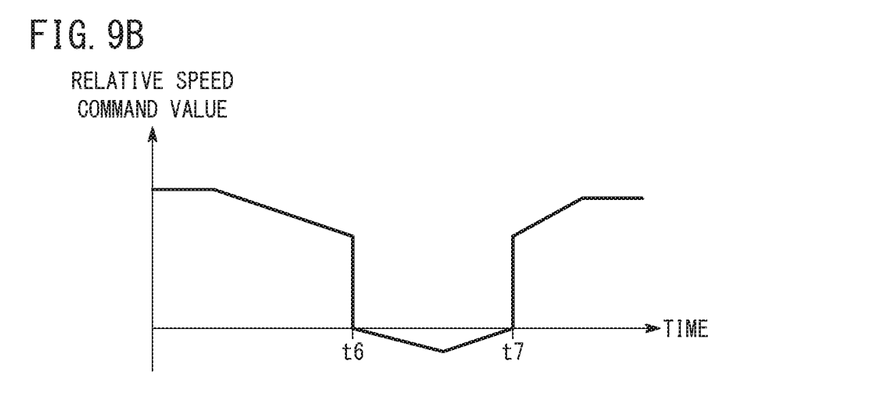
FIG. 9B is a time chart of a relative speed command value when the average gap voltage changes as shown in FIG. 9A.

FIG. 9A is a time chart of the average gap voltage when the discharge voltage is low with the backward-movement threshold being set to the second threshold Th2. FIG. 9B is a time chart of the relative speed command value when the average gap voltage changes as shown in FIG. 9A. At time t6, the average gap voltage changes in a decreasing direction, and the amount of change in the average gap voltage becomes equal to or greater than a predetermined variation. Accordingly, the backward-movement threshold is revised to the second threshold Th2 which is greater than the first threshold Th1. At this time, the second threshold Th2 is set at a value which the average gap voltage takes just before the amount of change in the average gap voltage becomes equal to or greater than the predetermined variation. Thus, when the discharge voltage is low, the backward-movement threshold can be set so as to avoid the region where the relationship between the gap distance and the average gap voltage is unstable, and the wire electrode 14 is moved backward in the machining path at an early stage, whereby it is possible to avoid contact between the wire electrode 14 and the workpiece W.

In the present, embodiment, when the wire electrode 14 has passed through the machining path segment defined by one block of the NC program after the revs ion of the backward-movement threshold from the first threshold Th1 to the second threshold Th2, the backward-movement threshold is reset to the first threshold Th1. The relationship between the gap distance and the average gap voltage tends to be unstable when the wire electrode 14 machines the inner side of a circular arc. This is because the machining area on the inner side of the circular arc is greater than that of the straight line, and the attractive force of the workpiece W to attract the wire electrode 14 also increases. In the linear machining path segment defined by the next block after passage through the arc-shaped machining path segment defined by the previous block of the NC program, the backward-movement threshold is reset to the first threshold Th1, whereby it is possible to prevent the machining speed from being lowered.

[Modification 1]

Figure 10:
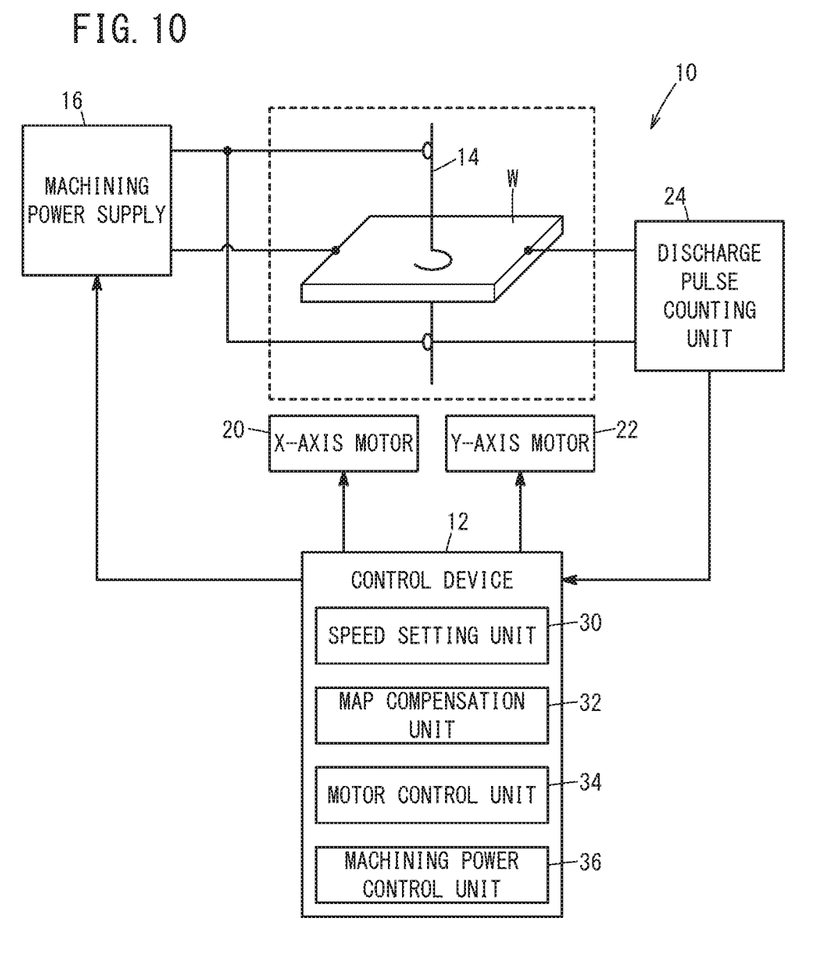
FIG. 10 is a schematic diagram showing a configuration of a wire electrical discharge machine and a control device for controlling the wire electrical discharge machine.

In the first embodiment, the relative speed command value is set according to the average gap voltage. However, the reciprocal of the number of discharge pulses per unit time may be used instead of the average gap voltage. Since the frequency of discharge pulses increases as the gap distance decreases, the gap distance and the number of discharge pulses per unit time are highly correlated so that the reciprocal of the number of discharge pulses per unit time may be used in the same manner as the average gap voltage. In this case, as shown in FIG. 10, the number of discharge pulses is detected by using a discharge pulse counting unit 24 instead of the gap voltage detection unit 18 of the first embodiment.

[Modification 2]

As described above, the relationship between the gap distance and the average gap voltage tends to become unstable when the wire electrode 14 machines the inner side of a circular arc. To deal with this, in a machining path segment defined by a block having a predetermined command code (e.g., G02 or G03) in the NC program, when the average gap voltage changes in a decreasing direction and the amount of change in the average gap voltage becomes equal to or greater than a predetermined variation, the backward-movement threshold may be revised to the second threshold Th2 greater than the first threshold Th1.

Even on a linear machining path segment, there are cases in which the amount of change in the average gap voltage becomes equal to or greater than a predetermined variation. However, the average gap voltage is less likely to fall sharply thereafter. In this case, if the backward-movement threshold is set to the second threshold Th2, the frequency of the wire electrode 14 moving backward in the machining path increases, thereby leading to a reduction in machining speed. This is why the backward-movement threshold is changed to the second threshold Th2 only in the machining path segments defined by blocks having predetermined command codes in the NC program. Thus, this makes it possible to suppress reduction in machining speed.

[Modification 3]

It is possible to provide a configuration in which, in a specific machining path segment designated by the operator from among the machining path segments defined by the blocks of the NC program, the backward-movement threshold is changed from the first threshold Th1 to the second threshold Th2 greater than the first threshold Th1, when the average gap voltage changes in a decreasing direction and the amount of change in the average gap voltage becomes equal to or greater than the predetermined variation.

Thus, the operator designates, from among the machining path segments, a machining path segment in which the wire electrode 14 and the workplace N are prone to be close together, and only with respect to such a machining path segment, the backward-movement threshold is changed to the second threshold Th2. Thus, it is possible to suppress reduction in machining speed.

[Modification 4]

In the first embodiment, the average gap voltage vs. relative speed command value map is set as shown in FIG. 3. That is, in the average gap voltage vs. relative speed command value map having the first threshold Th1 as the backward-movement threshold, the slope in the graph of change of the relative speed command value with respect to the average gap voltage is constant before and after the first threshold Th1. On the other hand, in the map of the average gap voltage vs. relative speed command value having the second threshold Th2 as the backward-movement threshold, the graph of change of the relative speed command value with respect to the average gap voltage is discontinuous before and after the second threshold Th2.

Figure 11:
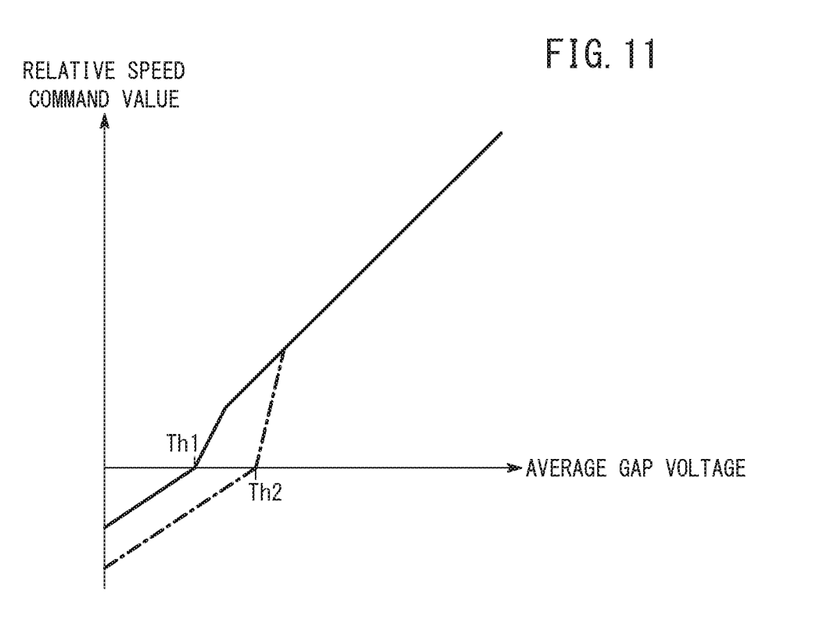
FIG. 11 is a diagram showing an average gap voltage vs. relative speed command value map.

The average gap voltage vs. relative speed command value map may be set as shown in FIG. 11. This average gap voltage vs. relative speed command value map having the first threshold Th1 as the backward-movement threshold is set such that the relative speed command value steeply decreases right before the first threshold Th1 as the average gap voltage decreases. Further, the average gap voltage vs. relative speed command value map having the second threshold Th2 as the backward-movement threshold is set such that the graph is continuous before and after the second threshold Th2 while the relative speed command value steeply decreases right before the second threshold Th2 as the average gap voltage decreases.

[Modification 5]

In the first embodiment, the backward-movement threshold in the average can voltage vs. relative speed command value map is revised only at the time of a finishing process. However, the backward-movement threshold may be revised similarly at the time of rough machining. This is because the wire electrode 14 tends to easily touch the workpiece W particularly when the machining speed is high.

[Modification 6]

In the first embodiment, the second threshold Th2 is set at a value which the average gap voltage takes when the average gap voltage changes in a decreasing direction and the amount of change becomes equal to or greater than a predetermined variation. However, the second threshold Th2 may be set at an arbitrary value that falls within a predetermined range containing the value which the average gap voltage takes when the average gap voltage changes in a decreasing direction and the amount of change becomes equal to or greater than the predetermined variation.

[Technical Concepts Obtained from Embodiments]

Technical concepts that can be grasped from the above embodiment will be described below.

The control device (12) for the wire electrical discharge machine (10) configured to perform electrical discharge machining on a workpiece (W) with the wire electrode (14) by relatively moving the wire electrode (14) with respect to the workpiece X in accordance with a NC program having a plurality of blocks (B1 to B3) configured to define a machining path includes: the discharge status acquisition unit (18, 24) configured to obtain a discharge status value, which is the gap voltage between the wire electrode (14) and the workpiece (W) or the reciprocal of the number of electrical discharge pulses between the wire electrode (14) and the workpiece (W); the speed setting unit (30) configured to set a relative movement speed of the wire electrode (14) with respect to the workpiece X depending on the discharge status value per unit time, and set the relative movement speed so as to move the wire electrode (14) backward when the discharge status value per unit time is less than a threshold; a threshold setting unit (32) configured to, when the discharge status value per unit time has changed in a decreasing direction and the amount of change in the discharge status value per unit time becomes equal to or greater than a predetermined variation, change the threshold from a first threshold that is set when the amount of change in the discharge status value per unit time is lower than the predetermined variation, to a second threshold that is greater than the first threshold; and the relative movement control unit (34) configured to perform control so as to relatively move the wire electrode (14) with respect to the workpiece along the machining path at the set relative movement speed. As a result, even when the discharge voltage is low as in a finishing process, it is possible to avoid contact between the wire electrode (14) and the workpiece (W).

In the control device (12) for the wire electrical discharge machine (10), when the discharge status value per unit time changes in the decreasing direction and the amount of change in the discharge status value per unit time is equal to or greater than the predetermined variation, the threshold setting unit (32) may be configured to set the second threshold depending on the discharge status value per unit time obtained when the amount of change in the discharge status value per unit time changes in a decreasing direction. This makes it possible to suppress a reduction in machining speed.

In the control device (12) for the wire electrical discharge machine (10), after changing of the threshold from the first threshold to the second threshold, the threshold setting unit (32) may reset the threshold to the first threshold after the wire electrode (14) has passed through a segment of the machining path defined by one of the blocks in the NC program. This makes it possible to suppress a reduction in machining speed.

In the control device (12) for the wire electrical discharge machine (10), in a segment of the machining path defined by one of the blocks that has a specific command code in the NC program, the threshold setting unit (32) may change the threshold to the second threshold when the discharge status value per unit time has changed in a decreasing direction and the amount of change in the discharge status value per unit time is equal to or greater than the predetermined variation. This makes it possible to suppress a reduction in machining speed.

In the control device (12) for the wire electrical discharge machine (10), in a segment of the machining path designated by an operator from among segments of the machining path defined by the blocks in the NC program, the threshold setting unit (32) may change the threshold to the second threshold when the discharge status value per unit time has changed in a decreasing direction and the amount of change in the discharge status value per unit time is equal to or greater than the predetermined variation. This makes possible to suppress a reduction in machining speed.

The control method of the wire electrical discharge machine (10) configured to perform electrical discharge machining on a workpiece (W) with the wire electrode (14) by relatively moving the wire electrode (14) with respect to the workpiece (W) in accordance with a NC program having a plurality of blocks (B1 to B3) configured to define a machining path includes: a discharge status acquisition step of obtaining, as a discharge status value, the gap voltage between the wire electrode (14) and the workpiece (W) or the reciprocal of the number of electrical discharge pulses between the wire electrode (14) and the workpiece (W); a speed setting step of setting a relative movement speed of the wire electrode (14) with respect to the workpiece (W) depending on the discharge status value per unit time and setting the relative movement speed so as to move the wire electrode (14) backward when the discharge status value per unit time is less than a threshold; and a relative movement control step of performing control go as to relatively move the wire electrode (14) with respect to the workpiece (W) along the machining path at the set relative movement speed. The speed setting step is configured to, when the discharge status value per unit time has changed in a decreasing direction and the amount of change in the discharge status value per unit time becomes equal to or greater than a predetermined variation, change the threshold from a first threshold that is set when the amount of change in the discharge status value per unit time is lower than the predetermined variation, to a second threshold that is greater than the first threshold. As a result, even when the discharge voltage is low as in a finishing process, it is possible to avoid contact between the wire electrode 14 and the workpiece W.

In the control method of the wire electrical discharge machine (10), the second threshold may be a value set depending on the discharge status value per unit time obtained when the discharge status value per unit time changes in a decreasing direction. This makes it possible to suppress a reduction in machining speed.

In the control method of the wire electrical discharge machine (10), the speed setting step may be configured to reset the threshold to the first threshold after the wire electrode (14) has passed through a segment of the machining path defined by one of the blocks in the NC program. This makes it possible to suppress a reduction in machining speed.

In the control method of the wire electrical discharge machine (10), the speed setting step may be configured to, in a segment of the machining path defined by one of the blocks that has a specific command code in the NC program, change the threshold to the second threshold when the discharge status value per unit time has changed in a decreasing direction and the amount of change in the discharge status value per unit time is equal to or greater than the predetermined variation. This makes it possible to suppress a reduction in machining speed.

In the control method of the wire electrical discharge machine (10), the speed setting step may be configured to, in a segment of the machining path designated by an operator from among segments of the machining path defined by the blocks in the NC program, change the threshold to the second threshold when the discharge status value per unit time has changed in a decreasing direction and the amount of change in the discharge status value per unit time is equal to or greater than the predetermined variation. This makes it possible to suppress a reduction in machining speed.

While the invention has been particularly shown and described with reference to preferred embodiments, it will be understood that variations and modifications can be effected thereto by those skilled in the art without departing from the scope of the invention as defined by the appended claims.

What is claimed is:
1. A control device for a wire electrical discharge machine configured to perform electrical discharge machining on a workpiece with a wire electrode by relatively moving the wire electrode with respect to the workpiece in accordance with a numerical control program having a plurality of blocks configured to define a machining path, the control device comprising a processor configured to:

obtain a discharge status value, which is a gap voltage between the wire electrode and the workpiece or a reciprocal of number of electrical discharge pulses between the wire electrode and the workpiece, set a relative movement speed of the wire electrode with respect to the workpiece depending on the discharge status value per unit time, and set the relative movement speed so as to move the wire electrode backward when the discharge status value per unit time is less than a threshold, when the discharge status value per unit time has changed in a decreasing direction and an amount of change in the discharge status value per unit time becomes equal to or greater than a predetermined variation, change the threshold from a first threshold that is set when the amount of change in the discharge status value per unit time is lower than the predetermined variation, to a second threshold that is greater than the first threshold, perform control so as to relatively move the wire electrode with respect to the workpiece along the machining path at the set relative movement speed, and when the discharge status value per unit time changes in a decreasing direction and the amount of change in the discharge status value per unit time is equal to or greater than the predetermined variation, set the second threshold depending on the discharge status value per unit time obtained when the discharge status value per unit time changes in a decreasing direction.

2. The control device for the wire electrical discharge machine according to claim 1, wherein the processor is further configured to, after changing the threshold from the first threshold to the second threshold, reset the threshold to the first threshold after the wire electrode has passed through a segment of the machining path defined by one of the blocks in the numerical control program.

3. The control device for the wire electrical discharge machine according to claim 1, wherein the processor is further configured to, in a segment of the machining path defined by one of the blocks that has a specific command code in the numerical control program, change the threshold to the second threshold when the discharge status value per unit time has changed in a decreasing direction and the amount of change in the discharge status value per unit time is equal to or greater than the predetermined variation.

4. The control device for the wire electrical discharge machine according to claim 1, wherein the processor is further configured to, in a segment of the machining path designated by an operator from among segments of the machining path defined by the blocks in the numerical control program, change the threshold to the second threshold when the discharge status value per unit time has changed in a decreasing direction and the amount of change in the discharge status value per unit time is equal to or greater than the predetermined variation.

5. A control method of a wire electrical discharge machine configured to perform electrical discharge machining on a workpiece with a wire electrode by relatively moving the wire electrode with respect to the workpiece in accordance with a numerical control program having a plurality of blocks configured to define a machining path, the method comprising:

obtaining, as a discharge status value, a gap voltage between the wire electrode and the workpiece or a reciprocal of number of electrical discharge pulses between the wire electrode and the workpiece;

setting a relative movement speed of the wire electrode with respect to the workpiece depending on the discharge status value per unit time and setting the relative movement speed so as to move the wire electrode backward when the discharge status value per unit time is less than a threshold; and performing control so as to relatively move the wire electrode with respect to the workpiece along the machining path at the set relative movement speed, wherein said setting the relative movement speed comprises, when the discharge status value per unit time has changed in a decreasing direction and an amount of change in the discharge status value per unit time becomes equal to or greater than a predetermined variation changing the threshold from a first threshold that is set when the amount of change in the discharge status value per unit time is lower than the predetermined variation, to a second threshold that is greater than the first threshold, and the second threshold is a value set depending on the discharge status value per unit time obtained when the discharge status value per unit time changes in a decreasing direction.

6. The control method of the wire electrical discharge machine according to claim 5, wherein said setting the relative movement speed further comprises resetting the threshold to the first threshold after the wire electrode has passed through a segment of the machining path defined by one of the blocks in the numerical control program.

7. The control method of the wire electrical discharge machine according to claim 5, wherein said setting the relative movement speed further comprises, in a segment of the machining path defined by one of the blocks that has a specific command code in the numerical control program, changing the threshold to the second threshold when the discharge status value per unit time has changed in a decreasing direction and the amount of change in the discharge status value per unit time is equal to or greater than the predetermined variation.

8. The control method of the wire electrical discharge machine according to claim 5, wherein said setting the relative movement speed further comprises, in a segment of the machining path designated by an operator from among segments of the machining path defined by the blocks in the numerical control program, changing the threshold to the second threshold when the discharge status value per unit time has changed in a decreasing direction and the amount of change in the discharge status value per unit time is equal to or greater than the predetermined variation.

* * * * *